US012686750B2

(12) United States Patent
Manenti

(10) Patent No.: US 12,686,750 B2
(45) Date of Patent: Jul. 21, 2026

(54) PROCESS OF DEGRADATION OF WASTE PLASTIC POLYMERIC MATERIAL MIXTURE AND RELATING PLANT

(71) Applicant: Politecnico di Milano, Milan (IT)

(72) Inventor: Flavio Manenti, Seriate (IT)

(73) Assignee: Politecnico di Milano, Milano MI (IT)

( * ) Notice: Subject to any disclaimer, the term of this patent is extended or adjusted under 35 U.S.C. 154(b) by 692 days.

(21) Appl. No.: 18/020,671

(22) PCT Filed: Aug. 5, 2021

(86) PCT No.: PCT/IB2021/057194
§ 371 (c)(1),
(2) Date: Feb. 10, 2023

(87) PCT Pub. No.: WO2022/034448
PCT Pub. Date: Feb. 17, 2022

(65) Prior Publication Data
US 2023/0265256 A1 Aug. 24, 2023

(30) Foreign Application Priority Data
Aug. 11, 2020 (IT) ......................... 102020000019951

(51) Int. Cl.
*C08J 11/12* (2006.01)
(52) U.S. Cl.
CPC ............ *C08J 11/12* (2013.01); *C08J 2327/04* (2013.01)
(58) Field of Classification Search
USPC .......................................................... 521/46
See application file for complete search history.

(56) References Cited

U.S. PATENT DOCUMENTS 5,904,879 A 5/1999 Winter et al.

FOREIGN PATENT DOCUMENTS

| DE | 19724147 | 12/1998 | |
|----|----------|---------|---|
| EP | 2649121 | 10/2013 | |
| EP | 2649121 B1 * | 1/2017 | .............. C10G 1/10 |
| JP | 2003055497 | 2/2003 | |
| JP | 2010126590 | 6/2010 | |

OTHER PUBLICATIONS

International Search Report, Written Opinion dated Jan. 5, 2022; PCT/IB2021/057194; 14 pages.
Ray et al; Thermal Degradation of Polymer, Handbook of Environmental Degradation of Materials (Third Edition) 2018; Science Direct.
Rigutto et al; Hydrocracking; Studies in Surface Science and Catalysis ,2007; Science Direct.

* cited by examiner

*Primary Examiner* — Terressa Boykin
(74) *Attorney, Agent, or Firm* — RANKIN, HILL & CLARK LLP; Erik J. Overberger

(57) ABSTRACT

Degradation process of mixtures of waste plastic polymeric material containing halogenated polymers comprising the steps of:

Figure 1:
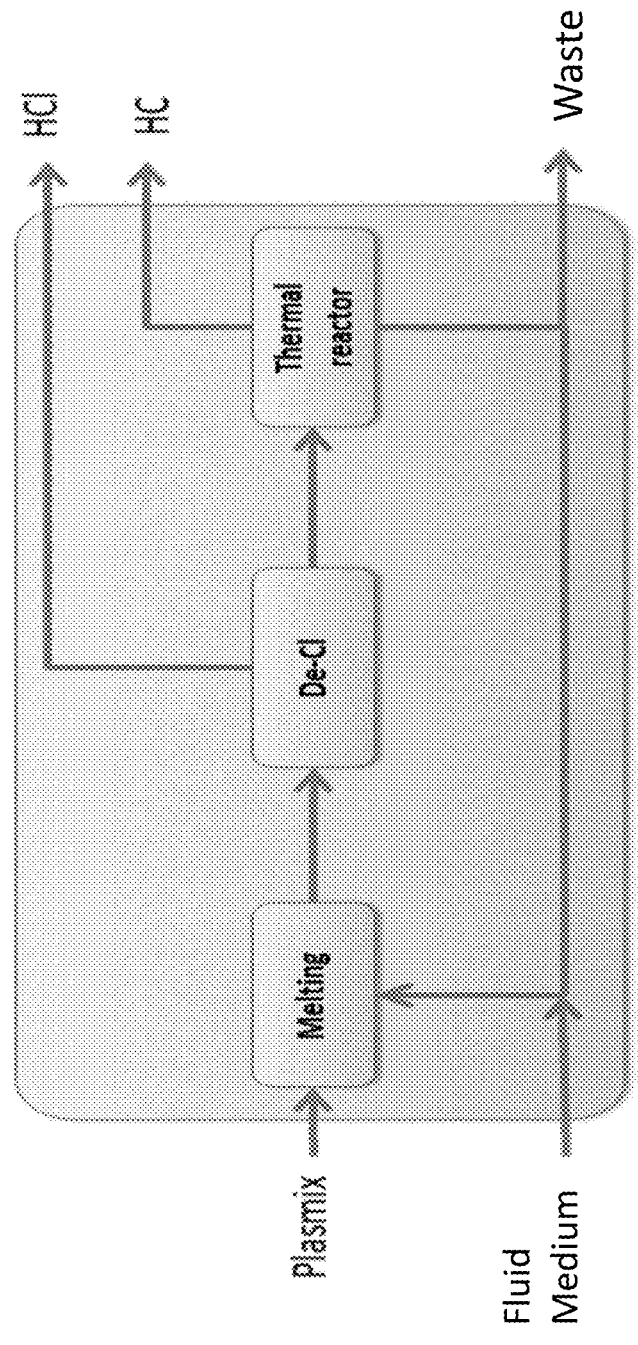

a) melting said plastic material at T>200° C. and ≤220° C.;

b) dehalogenating the molten mixture by production of gaseous halogenidric acid from the previous step (a) at T between 300 and 410° C., preferably between 320 and 380° C.:

c) degrading the dehalogenated mixture from step (b) at a temperature between 410° C. and 500° C. and with retention times >5 minutes and ≤20 minutes, wherein the reaction products mainly comprise low boiling hydrocarbons, and in lesser extent hydrogen, naphtha, gasoline, jet fuel, diesel, heavy oils, residues.

25 Claims, 5 Drawing Sheets

PROCESS OF DEGRADATION OF WASTE PLASTIC POLYMERIC MATERIAL MIXTURE AND RELATING PLANT

FIELD OF THE INVENTION

The present invention relates to a process and related plant for the treatment of waste plastic materials and for the chemical conversion thereof into a high added-value product.

BACKGROUND ART

The treatment of waste high chlorine plastic material, known as plasmix, is one of the major problems for environmental pollution which is worsening from year to year.

Plasmix is a complex mixture of different polymers, mainly linear-branched such as Polyethylene (PE) and Polypropylene (PP) for about 70% by weight and with a reduced content of aromatic polymers such as Polystyrene (PS) and Polyethylene Terephthalate (PET) for about 20%. For the remainder, plasmix can comprise chlorinated plastics (Polyvinyl Chloride, PVC) or Polycarbonates (PC) or Polyamides (for example Polymethylmetacrylate, PMMA), as well as other types of plastics in negligible quantities and with different types of waste (paper, metal . . . ).

The variability of plasmix and the complex composition thereof do not allow a recovery in circular economy by chemical means, if not in small quantities. To date, therefore, the best known technologies are those of mechanical conversion to recover large amounts of plasmix. On the contrary, chemical conversion technologies (pyrolysis, gasification, etc.) are effective in conversion, but are still constrained by environmental (especially combustion) or operational limitations (residues, packing, clinkering . . . ) which do not allow to exercise the conversion processes in a continuous and therefore economically convenient manner. Furthermore, from a practical point of view, the processes currently proposed have reduced conversions and require energy contributions and operating conditions which make them unattractive. Some examples of such processes are disclosed in EP823469 which uses sand for the pyrolysis process to be added to the molten plastic and in US2003/0211193 which treats the polymer mixture in the classical manner described above.

The need is therefore felt to have a process and a plant for the treatment of waste chlorinated plastic polymeric material which is economically convenient and at the same time allows to minimize unwanted products as well as to convert the polymeric material in its entirety into hydrocarbons, favouring the circularity of the sector.

WO2012/076890 concerns a continuous process and a plant for the recovery of waste plastic materials, transforming them into raw chemical materials and hydrocarbon fractions.

JP2003055497 A discloses a dechlorination method of a plastic comprising a preheating step and a dechlorination conducted in apparatus in which the molten plastic is dechlorinated and sent to a separator where it is subsequently separated from the chlorinated product.

U.S. Pat. No. 5,904,879 A concerns an integrated liquefaction and gasification process for the bulk conversion of halogen-containing waste plastic material particles, DE19724147 A1 concerns a process for the recovery of paraffins and/or micro-waxes in syngas and in a non-leachable glassy slag which is not toxic for the environment. From plastics used in a multi-stage process in which: the first stage consists of melting and cracking the starting material with simultaneous removal of the interfering substances, in the second stage the liquefied product is subjected to a degrading distillation which can be carried out under vacuum or atmospheric pressure and the products obtained are subjected to post-processing, characterized in that the old plastics or the mixtures thereof are partially dehalogenated in a melter at temperatures up to 280° C. in the absence of oxygen and the molten product obtained is subjected to cracking at temperatures between 300 and 380° C. and subsequently subjected to degrading distillation and flash evaporation at temperatures between 400 and 550° C.

JP2010126590 A relates to a method for treating waste plastic by a melting process in a furnace followed by a thermal decomposition process in a second furnace to remove the chlorine and produce solid fuel. The gas removed containing chlorine is subjected to a dechlorination process in which said chlorine-containing gas is burned in a furnace and where HCl is produced

SUMMARY OF THE INVENTION

In order to overcome the aforementioned problems, a process and a related plant have been designed which allow the degradation of the waste halogenated plastic polymeric material, allowing the high-efficiency conversion thereof into high value-added chemicals in addition to reducing the waste produced.

The object of the present invention is therefore a process for the degradation of mixtures of waste plastic polymeric material containing halogenated polymers comprising the steps of:

a) melting said plastic material at T>200° C. and ≤220° C.;

b) dehalogenating the molten mixture by production of gaseous halogenidric acid from the previous step at T between 300 and 410° C., preferably between 32° and 380° C.:

c) degrading the dehalogenated mixture from step (b) at a temperature between 410° C. and 500° C. and with retention times >5 minutes and ≤20 minutes, in which the reaction products mainly comprise low boiling hydrocarbons, and in lesser extent hydrogen, naphtha, gasoline, jet fuel, diesel, heavy oils, residues.

LIST OF FIGURES

Figure 2:
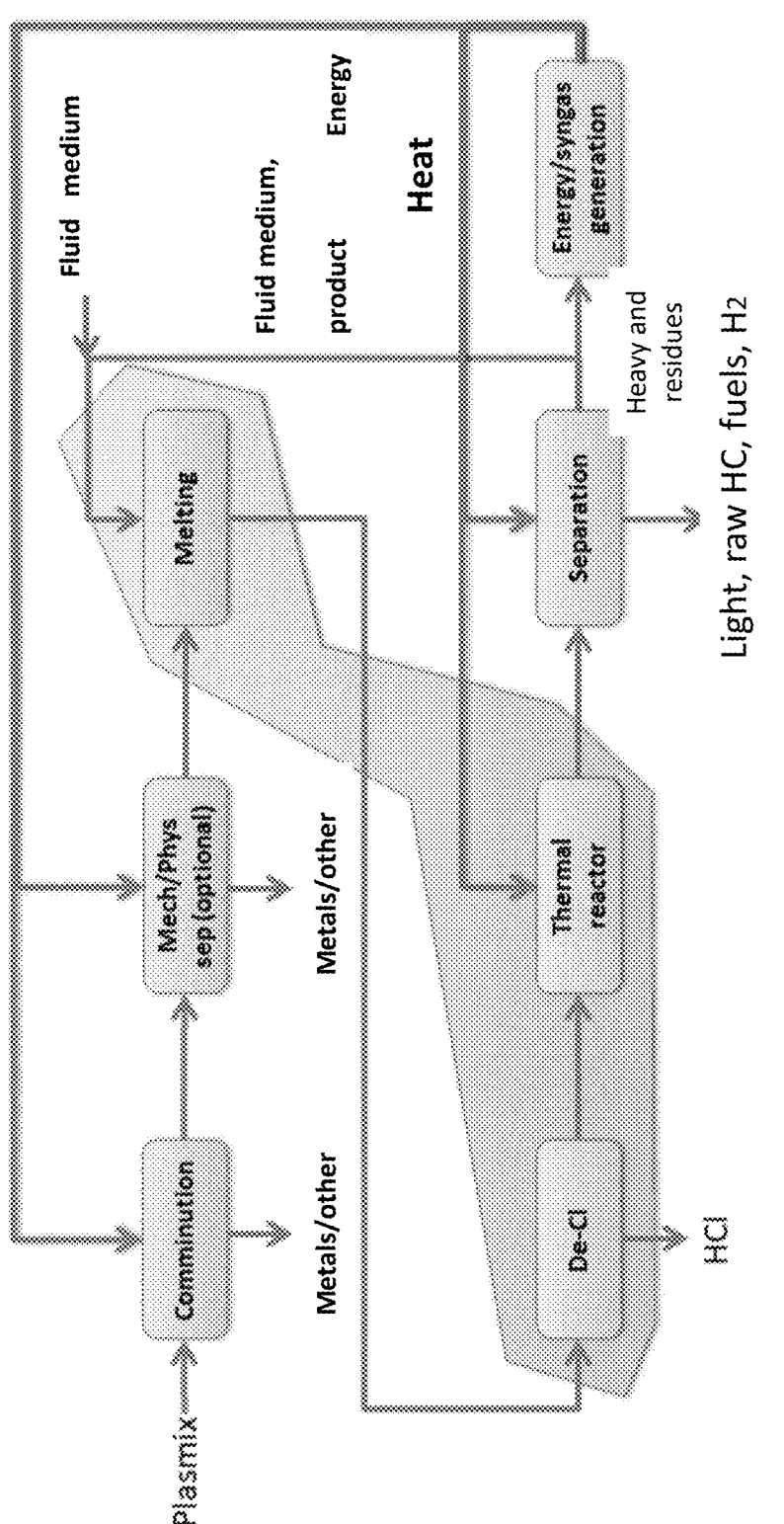
Figure 3:
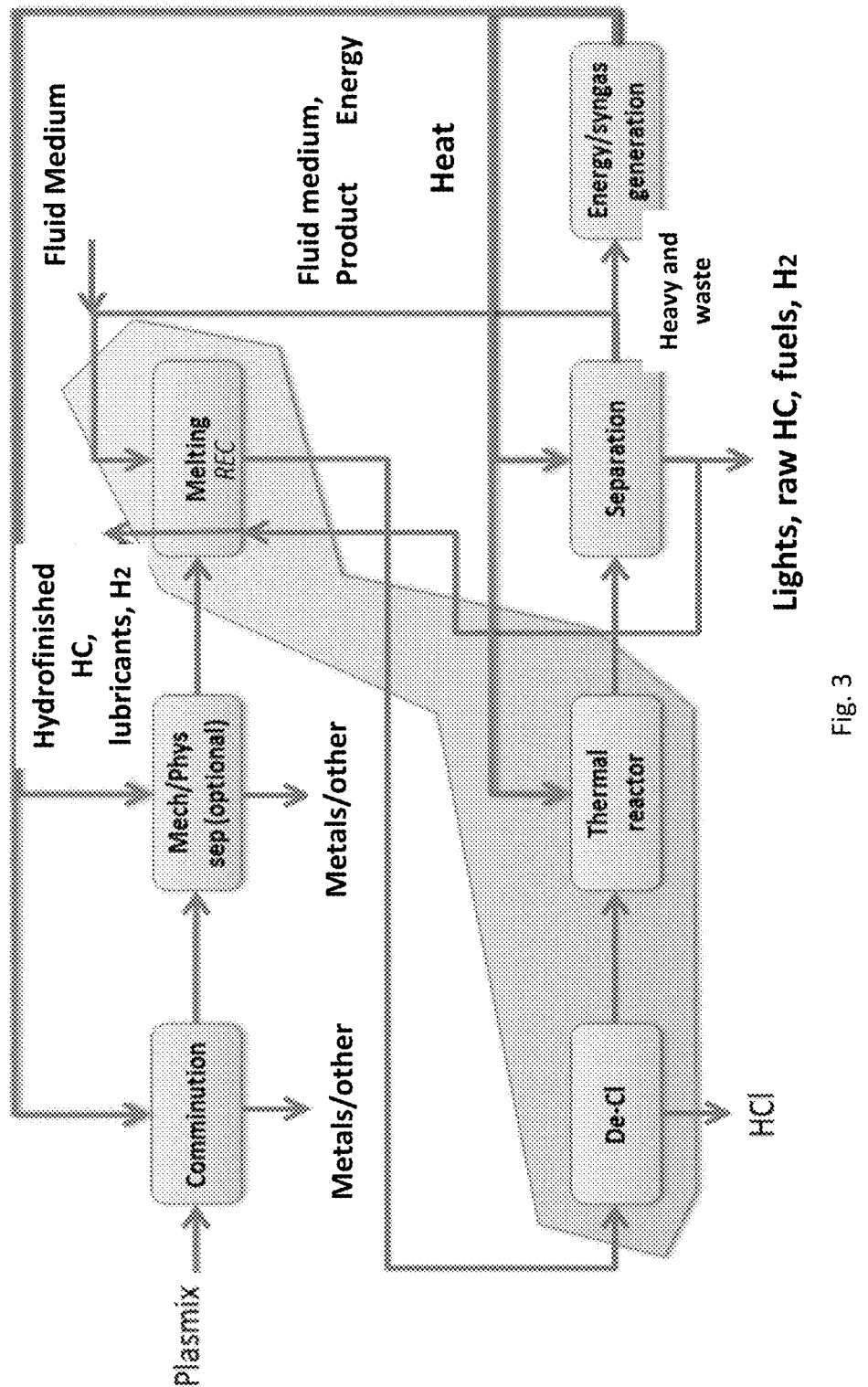
Figure 4:
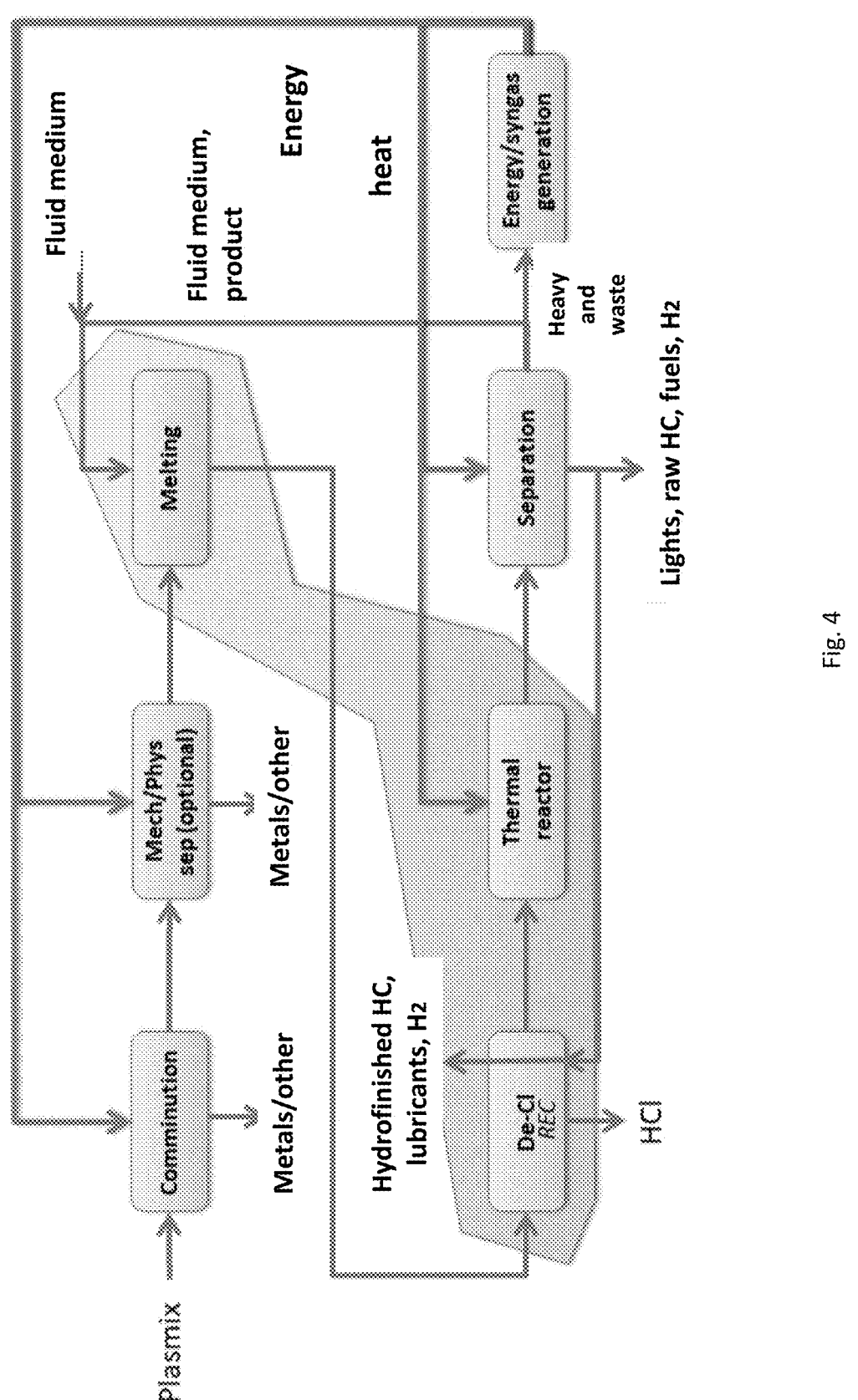
Figure 5:
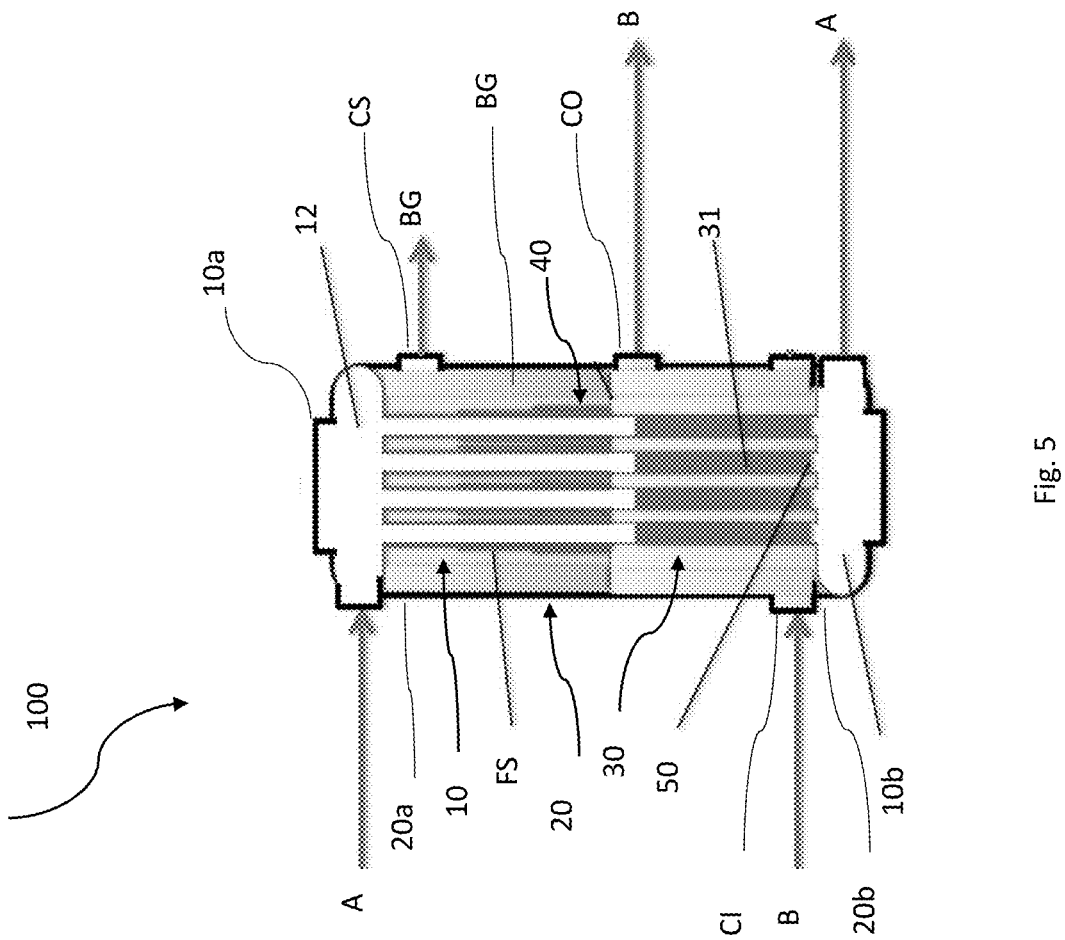

FIG. 1: schematic depiction of a part of the units of the plant for the degradation of mixtures of waste halogenated plastic polymeric material, in particular chloride, according to a first embodiment of the present invention;

FIG. 2: schematic depiction of the plant in which the units of FIG. 1 are inserted;

FIG. 3: schematic depiction of the plant according to a second embodiment of the present invention;

FIG. 4: schematic depiction of the plant according to a third embodiment of the present invention;

FIG. 5: schematic depiction of a unit of the section for the degradation of the waste chlorinated plastic polymeric mixtures of the plant of FIGS. 3 and 4.

DETAILED DESCRIPTION

For the purposes of the present invention, the definition comprising does not exclude the presence of additional components beyond those indicated after the aforesaid definition.

For the purposes of the present invention, the definitions consisting of, consisting in exclude the presence of additional components other than those mentioned after such definitions.

For the purposes of the present invention, halogenated polymers mean fluorinated polymers such as PTFE and fluorinated elastomers, chlorinated polymers such as PVC.

The process according to the present invention preferably allows the degradation of mixtures of waste chlorinated plastic polymeric material, known to those skilled in the art as "plasmix", defined as a set of heterogeneous plastics included in post-consumer packaging and not recovered as individual polymers. According to the present invention, the waste chlorinated plastic polymeric material comprises at least one or more polymers selected from linear-branched polymers, aromatic polymers, chlorinated plastics, polycarbonates, polyamides or a combination thereof. Preferably, the waste chlorinated plastic polymeric material comprises polyethylene (PE) and polypropylene (PP) for about 70% by weight and with a reduced content of aromatic polymers such as polystyrene (PS) and polyethylene terephthalate (PET) for about 20%. The remaining about 10% of the polymeric material comprises chlorinated plastics (Polyvinyl Chloride, PVC) or Polycarbonates (PC) or Polyamides (e.g., Polymethylmetacrylate, PMMA), as well as other types of plastics in negligible quantities and with different types of waste (paper, metal . . . ).

An example of composition and plasmix is given in the following table.

| Plasmix composition (from Enea and Corepia) | |
| --- | --- |
| Polymer types | % m/m |
| PE | 40-50 |
| PP | 20-30 |
| PS | 10-20 |
| PET | 5-10 |
| PVC | 2-4 |
| ALTRO | 10-15 |
| Typical plasmix composition: Polymer types whitin | |

Advantageously, the subdivision of the degradation process in steps a), b) and c) allows to use reduced temperatures, favouring the possibility of self-supply of energy thus avoiding combustion systems and external generators. In fact, the known pyrolysis processes operate at 600-900° C., the gasification processes operate at temperatures even above 1000° C. and the combustion processes go well beyond such operating conditions. Instead, the invention requires temperatures of around 410-500° C. and preferably 450-500° C. for the degradation of the main plastic matrices.

In accordance with a preferred embodiment, the process comprises a pre-treatment step prior to step a) by comminuting the waste halogenated plastic polymeric material and separation of metal components. Such a pre-treatment step is carried out by techniques known to those skilled in the art. For example, the comminution takes place mechanically or with the aid of cryogenic fluids. With regard to the removal of metal components but also other non-polymeric components such as glass and paper, mechanical and/or physical separators are used. Preferably the step of separating of the non-polymeric components (such as for example metals, glass and paper) is carried out in a step after the comminution. Furthermore, to facilitate the removal of the non-polymeric components, the separation step is conducted downstream of the comminution and upstream of step a). More preferably, in the metal separation step even the most degradation-refractory polymers, such as for example PMMA or PC, and/or chlorinated polymers, are separated from the mixture of waste polymers.

The waste chlorinated plastic polymeric material, suitably comminuted and cleaned of any metal residues, is fed to step a) where it is dissolved.

In accordance with a preferred embodiment, the process provides during the melting step a) adding to the plastic material a fluid medium which is similar and resistant to the process temperatures, preferably chosen from a high-boiling hydrocarbon or a diathermic oil. Preferably, said fluid medium has a degradation temperature of at least 520° C. In particular, such a fluid medium is chosen so that it is similar to the oligomers which derive from the same thermal degradation of the plastics. Furthermore, the added fluid medium is also chosen so as to be stable at the degradation temperatures of the mixture of waste halogenated plastic polymeric material.

Preferably, the fluid medium during step a) acts as a thermal bath for melting the polymeric material and must not degrade or solidify at the melting temperature which is around 200° C.

The addition of a fluidizer has the further advantage of homogenizing the comminuted polymers, which at the aforesaid temperature of step a).

More preferably, the fluid medium is added in quantities between 2% and 99%, preferably between 40% and 99%, more preferably between 60% and 99% by volume on the total volume of said waste chlorinated material and the fluid medium.

Even more preferably, the process provides for a controlled degradation of the fluid medium by adjusting the process temperature itself. It should also be noted that the waste produced downstream from the degradation step can comprise what is known to those skilled in the art as tar. The latter can be used as an additional degradable fluid medium, thus improving the efficiency of the process. In other words, the process according to a preferred embodiment provides for recycling the tar produced, using it at least in part as a fluid medium and degrading the same tar by adjusting the process temperature as a function of the amount of tar introduced.

Advantageously, the use of the fluid medium allows the reduction of the phenomenon of clinkering (compaction) of the plastic matrices during the melting of the mixture in the same step a) and also in the subsequent steps b) and c).

Specifically, the fluid medium is chosen according to the composition of the polymer mixture, in fact, it is possible to opt for an oil resistant to high temperatures, in order to recycle it continuously, or an oil which progressively degrades together with the plastics where the thermal degradation process progressively contributes to the formation of the same fluid medium to be reinserted in step a).

Subsequently, the process provides during step b), the removal of the halogen in the form of halogenidric acid HX, in which X is F is Cl, preferably it is Cl and the halogenidric acid is hydrochloric acid. In this case the temperature range used for step b) allows the formation of gaseous hydrochloric acid and the subsequent elimination thereof without incurring the degradation of the polymeric material. In fact, the polymers comprised in the polymeric material mixture undergo degradation at higher temperatures than those used in step b):

PVC starts to degrade above 250° C. and markedly above 300° C.

PS degrades at about 410° C.

PP degrades at about 440° C.

PE degrades at about 460° C.

It should be noted that, unlike other polymers, PVC has two typical plateaus of phase changes when subject to thermal degradation: a first plateau between 370° C. and 430° C. and a second plateau above 500° C. The first is attributed to the devolatilization of the chlorinated content, through the formation of HCl, while the second plateau concerns the agglomeration of the dechlorinated polymer towards increasingly complex and difficult to attack structures (clinkers).

Therefore, in light of the different degradation temperature, advantageously step b) operates at a temperature between 300 and 410° C., preferably between 32° and 380°. Specifically, step b) operates between the minimum HCl removal temperature (already active at 300° C., but marked at 370° C.) and the degradation temperature of the less resistant polymer (410° C., polystyrene degradation). More preferably, the heat pre-treatment is maintained at temperatures in the range 340-380° C.

It should be noted that the fluid medium is configured to resist stably and not degrade even under the conditions of step b).

Advantageously, the separation of the chlorine in a step b) in itself avoids the use of expensive materials for the management of the hydrochloric acid HCl produced during the degradation in the other steps of the process and of the plant. In fact, it is possible to use expensive materials only for the unit in which step b) takes place, which can therefore be designed with small dimensions with respect to those known and the remaining units.

Once the chlorine has been eliminated, the process comprises the step c) of degrading the dechlorinated mixture from step b) at higher temperatures than the previous steps a) and b) and for heat treatment times, between 5 and 20 minutes, which are a function of the temperature used. Optionally, the process comprises a further degradation step downstream of step c) conducted inside a soaker.

It should be noted that during step c) for the temperature range used it is also possible that the fluid medium in which the polymeric material is dissolved degrades into minor hydrocarbons, such as naphtha.

Advantageously, the degradation of the dechlorinated polymeric material is substantially total and favoured by long residence times and with reduced solid products.

It should be noted that as a result of the degradation in step c) and the previous steps, the final products are light hydrocarbons and/or heavy hydrocarbons, such as hydrogen, naphtha, gasoline, jet fuel, diesel, heavy oils and residues.

In accordance with the present invention, step c) allows to produce the hydrocarbon currents comprising:

non-condensable, from hydrogen to C2 hydrocarbons, light hydrocarbons from C3 to C7;

intermediate from C8 to C16 heavy hydrocarbons from C17 to C20/C30 residues C20+/C30+ and possible solids.

Advantageously, the process allows to produce naphtha and olefins (base for the production of polymers by thermal/steam cracking processes), preferably, virgin naphtha as a product of interest. Furthermore, the process also allows the production of chemicals from naphtha and heavier hydrocarbons (through reforming, separations, hydro-finishing).

Preferably, the process comprises a step of separating the hydrocarbons produced in step c) so as to be able to reuse them for example for the production of high added-value products, for the energy supply of the process itself and for hydro-finishing processes.

In particular, according to the present invention, the process comprises a step of recycling to step a) the waste produced during step c) and/or waste halogenated plastic polymeric material not reacted in step c). In detail, the portion of mixtures of waste halogenated plastic polymeric material not completely degraded in step c) is reinserted into the unit in which step a) takes place, thus favouring recycling and improving the efficiency of hydrocarbon production and therefore the degradation of the entire plasmix.

It is thereby possible to improve the efficiency of the entire process. It should be noted that preferably the recycling step provides for a purge in order to avoid accumulations and problems in the plant. Such a purge can also be used in a gasification/enhancement step in order to energetically self-sustain the entire process.

A further use of the hydrocarbons exiting from step c) is hydro-finishing. In fact, the whole process may need hydrogen to hydro-finish the products. In such a case, the stream of non-condensable hydrocarbon gases leaking from step c) may be sent to a conventional train normally used in a refinery for the generation of hydrogen:

(i) a naphtha steam reformer for syngas production;

(ii) the syngas is shifted into a water-gas shift reactor;

(iii) the hydrogen is separated from the CO2 by amine washing or pressure swing adsorption.

According to a preferred embodiment the process also comprises steps for treating the hydrochloric acid and separating it from any hydrocarbon components. Such a step preferably provides the condensation of the hydrocarbons and subsequent separation of the gaseous hydrochloric acid.

Advantageously, the treatment of waste chlorinated plastic polymeric material mixtures divided into three steps a), b) and c) allows the reduction of the waste produced and the possible recycling thereof to improve efficiency and/or to provide energy to the process.

Advantageously, the process promotes process sustainability since in step c) it is possible to generate in situ a recyclable high boiling fluid medium in step a) to facilitate the dilution of the plastics. It should be noted that it is thereby only possible to initially supply the process with the fluid medium. In accordance with an alternative embodiment, the choice of the fluid medium must involve a good thermal resistance for continuous recycles, avoiding degradation together with the polymeric mixture.

It should be noted that if the process is carried out in milder operating conditions, it favours the production of heavier products to be separated and possibly hydro-finished. In detail, the process allows the production of lubricating bases by hydro-finishing processes which use the hydrogen co-produced by the process. In fact, in accordance with an embodiment, the process can simultaneously generate heavy products and a discrete amount of hydrogen to hydro-finish the heavy loads with the latter and obtain lubricating bases. Among these lubricating bases, it is also possible to select the fluid medium to be used within the process. Finally, the process according to the present invention also allows the production of mildly hydro-finished oils (by hydro-finishing processes).

It should be noted that the use of the furnace in steps a) and b) and the use of low temperatures further favours the self-sustainment of the process. Furthermore, the furnace described in detail below improves the heat exchange and energy efficiency of the entire process.

Advantageously, thanks to the low temperatures, the process requires an equally low energy contribution with respect to other technologies. Furthermore, the use of the reactor, described below, reduces the energy supply needed as it allows for conversion and improved heat exchange.

Advantageously, the process according to the present invention allows to improve the management of plasmix heterogeneities without the need for plasmix upgrading, while providing high process strength with respect to other treatment processes.

Advantageously, the process according to the present invention using mild degradation conditions, preferably at temperatures below 500° C., requires the use of less valuable materials, favours energetic self-sustainability, ensuring a lower environmental impact, a lower economic impact (costs) and lower process risks with respect to other thermal processes.

Advantageously, the process according to the present invention avoids the use of oxygen contrary to gasification and combustion, favouring the conversion to light hydrocarbons (circular economy) instead of syngas or energy.

It is a further object of the present invention, a plant for the degradation of mixtures of waste halogenated plastic polymeric material in which the degradation process is conducted.

For the purposes of the present invention, a plant is a set of one or more units which are thermally integrated with each other and/or in fluid communication.

For the purposes of the present invention, a unit is defined as a unit in which reagents such as polymeric mixtures and/or reaction gases are treated.

The plant according to the present invention comprises a unit in which step a) indicated in the figures with MELTING is conducted. In such a unit, the plastic material is melted according to the operating conditions of step a). Furthermore, in accordance with the foregoing, a fluid medium is added in the MELTING unit to facilitate the melting of the polymers and avoid clinkering phenomena. Said fluid medium may be added ex novo and/or combined with the non-degraded fluid medium/product from the subsequent steps in particular from step c) conducted in a separate unit with respect to the MELTING unit.

In accordance with a preferred embodiment, the plant comprises a unit in which the plasmix comminution step is conducted, indicated in the figures with COMMINUTION, upstream of the MELTING unit. Specifically, the raw plasmix is loaded into the COMMINUTION unit, where it is comminuted in order to facilitate the melting in the following steps. Optionally, the plant provides a unit indicated with MECH/PHYS SEP in the figures arranged downstream of the COMMINUTION unit and upstream of the MELTING unit and configured to separate metals, glass, paper, cardboard and other polymeric substances as well as specific polymers as indicated above. Specifically, the MECH/PHYS SEP unit receives the comminuted polymers in input, devoid of any metals and other materials and directs the polymeric mixture to the MELTING unit.

The plant according to the present invention comprises a unit indicated with De-Cl in the figures, in fluid communication with the MELTING unit. The second process step b) is conducted in such a unit. In particular, in the De-Cl unit, the molten material from the previous MELTING unit is dechlorinated according to the operating conditions of step b).

It should be noted that the sizing of the De-Cl unit is directly related to the degree of HCl removal desired and the overall sizing follows what is already known for the soaker units of the thermal treatment processes of the oil loads. The choice of materials is suited to the process units comprising gaseous HCl. In fact, it is possible to reduce the size of the present De-Cl unit, reducing the costs of the necessary materials and at the same time improving the efficiency of the process and the plant, facilitating the degradation of the plasmix.

Preferably, the De-Cl unit in which step b) of removal of the plant takes place provides an additional unit or a section of separation of the HCl from the dechlorinated molten polymer. More preferably, the De-Cl unit comprises a further unit or section thereof for separating HCl from any hydrocarbons produced in step b) and for the subsequent condensation thereof.

The plant according to the present invention comprises a unit, indicated with THERMAL REACTOR in the figures, in fluid communication with the De-Cl unit. Step c) of the process is conducted in such a unit. Specifically, in the THERMAL REACTOR unit, the dechlorinated molten material from the previous De-Cl unit is subjected to thermal degradation according to the operating methods of step c).

Preferably, the THERMAL REACTOR unit in which the thermal degradation takes place is a tubular reactor equipped with several multipass tubes. Thereby, the unit in question allows high residence times of the melted and dehalogenated polymeric mixture in order to optimize the degradation thereof, especially when using mild conditions.

Advantageously, the units in which steps a), b) and c) are conducted are distinct and separate. It is thereby possible to exploit the advantages listed above related to both the process and to the type of materials which can be used as well as to the size of the plant itself. Such a structure allows to improve the efficiency in treating the polymeric material and any reuse of the degradation products such as for example for the hydro-finishing and/or energetic self-sustaining of the plant itself.

Optionally, the plant in which the process is conducted comprises a soaker downstream of the unit in which step c) takes place in order to improve the degradation of the dehalogenated mixture coming from step (b) and treated in step c).

According to a preferred embodiment, the plant comprises at least one unit, indicated by SEPARATION in the figures, downstream of the THERMAL REACTOR unit and configured to receive the products from the THERMAL REACTOR unit and divide them as a function of the type of hydrocarbons. In particular, the SEPARATION unit separates the $H_2$ and the hydrogen and the non-condensible and $C_1$-$C_2$ fractions from the remaining light and condensable $C_3$-$C_7$ fractions, from the intermediate fractions $C_8$-$C_{16}$ and the high-boiling heavy fractions ($C_{17}$-$C_{20}$/$C_{30}$), as well as from the residues containing any solid fractions $>C_{30}$. Preferably, the SEPARATION unit comprises a further unit or a section thereof in which the $C_3$-$C_7$ fractions are condensed and/or separated from the rest of the hydrocarbon mixture comprising high-boiling intermediate and heavy fractions ($C_9$-$C_{20}$/$C_{30}$) and residues containing any solid fractions $>C_{30}$. More preferably, the SEPARATION unit comprises at least one additional unit capable of splitting gasoline, jet fuel and diesel, in addition to other products required by the market.

In accordance with a preferred embodiment, the plant provides for the recycling of a part of the hydrocarbons exiting the SEPARATION section. In particular, the heavy hydrocarbons and any solid residues are recycled both upstream and downstream of the separation unit. In detail, a part of such hydrocarbons is reintroduced inside the melting unit in order to maximize the degradation of the oligomers (polymers already partially degraded) and also to reduce the amount of fluid medium to be added to the MELTING unit as make-up. In fact, the fluid medium not completely degraded, added in the MELTING unit at the beginning of the process, and/or generated in situ in the THERMAL REACTOR unit as described above, is also present at the exit from the SEPARATION unit.

Instead, the remaining portion of the heavy hydrocarbons together with the non-recycled purge to the MELTING unit, as comprising solidified particulate portions, is fed to an energy and/or syngas producing unit, indicated by ENERGY/SYNGAS GENERATION in the figures. Advantageously, such a unit is configured to at least partially, preferably totally, feed the COMMINUTION, MECH/ PHYSICAL SEP, THERMAL REACTOR and SEPARA-TION units.

In other words, the residue containing any solids is mainly recycled unless purged to avoid accumulation, in an ENERGY/SYNGAS GENERATION unit upstream of said plant, where it can be gasified/enhanced to energetically self-sustain the entire process.

In accordance with a preferred embodiment, the plant also provides for recycling the light hydrocarbons and the non-condensables produced by the degradation of plasmix and separated from the rest of the hydrocarbons at the SEPA-RATION unit. In particular, the non-condensables are intended for the production of hydrogen for the hydrocarbon hydro-finishing and are sent to a conventional train normally used in a refinery for the generation of hydrogen comprising:

(i) a naphtha steam reformer in which syngas is produced;
(ii) the syngas from the previous step ii) is sent to a water-gas shift reactor; and
(iii) the hydrogen from the previous step (ii) is separated from $CO_2$ by amine washing or by pressure swing adsorption or similar systems.

It should be noted that in accordance with a preferred embodiment illustrated in FIGS. 3 and 4, the MELTING unit is thermally integrated with the THERMAL REACTOR unit and/or the De-Cl unit is thermally integrated with the THERMAL REACTOR unit. Where, for the purposes of the present invention, the definition of thermally integrated means that the thermal energy produced/developed in one unit is used for the operation of the other unit by direct contact and without heat thermal fluids (HTFs).

Preferably, the unit in which step a) takes place and/or the unit in which step b) takes place of the plant in which the process is conducted comprise at least one reactor for gas-phase non-isothermal reactions 100.

The reactor 100 comprises a tubular reactor 10 comprising at least one tube 11, preferably a plurality of tubes, through which the reaction fluids A pass and in which the mixture of hydrocarbons produced in step c) is defined and in which tubular reactor a portion 30 is defined where at least one non-isothermal reaction takes place. The reactor 100 further comprises a shell 20 external to the tubular reactor 10 in which a fluid B defined by the polymeric mixture to be treated passes.

In particular, the reaction fluids A enter at the head 10a of said tubular reactor 10 and exit at the tail of the tubular reactor 10 itself. It should be noted that the portion 30 where at least one non-isothermal reaction takes place is filled with a specific catalyst for such a reaction. Instead, the cooling/ heating polymeric mixture B flowing in the shell can be introduced into said reactor in solid-phase, liquid-phase, and/or a combination thereof and acts both as a cooling fluid and as a heater for the reaction fluids A at different portions of the same tubular reactor 10.

In detail, in the external shell 20, at least one liquid-gas separation zone 40 is defined, in which at least one gas-liquid separation step of the polymeric mixture B takes place.

Even more in detail, the reaction is exothermic and the reactor is used to preheat the reagent fluids A before said exothermic reaction takes place and the catalyst is located at the tail of the tubular reactor 10.

An embodiment of the reactor according to the present invention is illustrated in FIG. 5. Preferably, in this embodiment the catalyst 31 within the portion 30 is arranged in the tail 10b of the tubular reactor 10. In this manner, the portion 30 acts as a heating unit of the cooling/heating polymeric mixture B in place of a conventional external reboiler.

In particular, the polymeric mixture B is introduced inside the shell in a liquid BL and/or solid BS stage at the tail of the reactor. Thereby, the polymeric mixture B submerges the portion 30 of the tubular reactor 10. Preferably, in order to avoid overheating in the reaction zone and any breakage of the tubular reactor 10, the polymeric mixture B submerges not only the reaction portion 30 but also a contiguous part of the tubular reactor 10 in the direction of the head 10a. The reaction fluids A enter from the head 10a of the tubular reactor 10 at a temperature lower than the reaction temperature at the portion 30. Preferably, the tubular reactor is provided with a plenum 12 from which the reaction fluids A enter, reaching a uniform pressure and temperature and are pushed inside the one or more tubes 11 towards the tail 10b of the tubular reactor 10 and from which they exit. The reaction fluids A exchanging heat with the gases BG produced by the melting and/or heating of the polymeric mixture B at the separation portion 40 gradually increase the temperature during the passage from the head to the tail of the tubular reactor 10. In other words, the gases BG occupy the empty volume of the shell 20 at the liquid-gas separation portion 40.

The reaction fluids A reach the reaction portion 30 where the catalyst 31 is arranged at a suitable temperature and react according to an exothermic reaction. The output mixture comprises hydro-finished HC and hydrogen.

The heat produced by such a reaction is removed from the polymeric mixture B externally surrounding the tubes 11 of the tubular reactor 10, causing them to melt and/or further heat. Thereby, the polymeric mixture B acting as a refrigerant removes the heat produced by the exothermic reaction by at least partially passing from the liquid to the gas phase. Thereby, the liquid-phase polymeric mixture B is fed to the subsequent units while the gas phase migrates to the head of the reactor 100.

The gas phase BG of the polymeric mixture B condenses at least partially at the liquid-gas separation zone 40 defined by the shell 20. Specifically, the gas phase BG migrating towards the head of the reactor 100 impacting on the plurality of tubes 11 condenses and exchanges heat with the reaction fluids A at a lower temperature than the fluid B in the vapour state.

Advantageously, it is thereby possible to exploit the latent heat of the polymeric mixture B twice. In fact, the latter releases the same latent heat in the gaseous state, for the phase passage, to the reagent fluids A.

Furthermore, it should be noted that the gas phase BG condensing on the plurality of tubes 11 at the liquid-gas separation zone 40 forms a thin film FS on the tubes themselves, further improving the heat exchange with the fluids A.

It should be noted that the mixture can be introduced in the shell by means of an input channel CI and can be sent to the next unit via an output channel CO.

Furthermore, the reactor 100 on the shell side comprises a vent channel CS at the shell head 20a and configured to discharge the non-condensed gas phase BG.

In accordance with the present variant, the catalyst 31 is loaded from the head 10a of the tubular reactor 10 by inserting it inside the tubes 11 and is discharged from the tail 10b of the tubular reactor 10 itself.

Advantageously, the present variant allows to intensify the heat exchange in order to preheat the reagent fluids A in order to achieve an exothermic reaction.

In accordance with a preferred embodiment, the reactor 100 comprises a support grid 50 for the tubular reactor 10 at the tail thereof.

In maintenance operations, the catalyst is discharged from the reactor tail.

The preferred configurations are shown below.

Reactor in the MELTING Unit (FIG. 3)

In this configuration, the MELTING unit is thermally integrated with the THERMAL REACTOR unit by means of the SEPARATION unit. Specifically, in the reactor 100 the exothermic hydrocarbon hydro-finishing reaction is conducted, the flow A contains light hydrocarbons and hydrogen as input reagents which are fed at a temperature of 200° C.-240° C. in a molten plasmix bath at about 250° C.-270° C. to initially activate the catalyst. Thereafter, the exothermic reaction will progressively raise the temperature of the catalytic bed, which will then be maintained at 300° C.-320° C. Specifically, the heated polymeric mixture B produces gas-phase hydrocarbons and removes heat produced by the exothermic reaction. The heavy hydrocarbons in the gas phase, in the migration thereof towards the shell head, condense on the liquid-gas separation zone 40 by exchanging heat with the reagents A and relapse in the liquid phase towards the polymeric mixture at the portion 30. Instead, the light hydrocarbons are expelled from the vent channel once they are separated from the heavy hydrocarbons for any subsequent treatment steps.

Reactor in the De-Cl Unit (FIG. 4)

In this configuration, the De-Cl unit is thermally integrated with the THERMAL REACTOR unit by means of the SEPARATION unit. Specifically, in the reactor 100 the exothermic hydrocarbon hydro-finishing reaction is conducted, the flow A contains light hydrocarbons and hydrogen as input reagents which are fed at a temperature of 200° C.-240° C. in a molten plasmix bath at about 250° C.-270° C. to initially activate the catalyst, the exothermic reaction will then progressively raise the temperature of the catalyst bed, which will then be maintained at 350-370° C. Specifically, the heated polymeric mixture B produces gas-phase heavy hydrocarbons together with the gaseous hydrochloric acid and removes the heat produced by the exothermic reaction. The gases produced by heating the polymeric mixture B, migrating towards the shell head, favour the separation between heavy hydrocarbons and hydrochloric acid. In fact, the reactor 100 thus allows, by condensing the heavy hydrocarbons on the liquid-gas separation zone 40, the separation from the gaseous hydrochloric acid which is expelled from the vent channel.

Advantageously, the use of the reactor promotes the energetic self-sustainment of the plant in addition to improving the efficiency in the degradation of the polymers with the production of high added-value products.

The invention claimed is:

1. A degradation process of mixtures of waste plastic polymeric material containing halogenated polymers comprising the steps of:
   a) melting said plastic material at T>200° C. and ≤220° C.;
   b) dehalogenating the molten mixture by production of gaseous halogenidric acid from the previous T stage between 320 and 380° C.; and
   c) degrading the dehalogenated mixture from step (b) at a temperature between 410° C. and 500° C. and with retention times >5 minutes and ≤20 minutes, wherein the reaction products mainly comprise low boiling hydrocarbons, and in lesser extent hydrogen, naphtha, gasoline, jet fuel, diesel, heavy oils, residues.

2. The process according to claim 1, wherein said waste halogenated polymers are fluorinated or chlorinated polymers.

3. The process according to claim 1, wherein said halogenated polymers are chlorinated polymers.

4. The degradation process according to claim 1, wherein the process comprises a step prior to step a) of pre-treating by comminution of the waste plastic polymeric material, and a separation of metal components.

5. The process according to claim 4, wherein said separation of the metal parts takes place in a separate step after comminution.

6. The process according to claim 5, wherein, in the metal separation step, the most refractory polymers to degradation separate from the mixture of waste polymers.

7. The degradation process according to claim 1, wherein during the melting step a) a fluid medium resistant to process temperatures selected from a high-boiling hydrocarbon or a diathermic oil is added to said plastic material.

8. The degradation process according to claim 7, wherein the fluid medium is added in quantities ranging from 2% to 99% by volume on the total volume of said waste plastic material and said fluid medium.

9. The degradation process according to claim 1, wherein the process comprises a step of separating the hydrocarbons produced in step c).

10. The degradation process according to claim 1, wherein the process comprises a recycling step at step a) of the waste produced during step c) and/or waste halogenated plastic polymeric material not reacting in step c).

11. The degradation process according to claim 1, wherein the waste plastic polymeric material comprises at least one or more polymers selected from linear or branched polymers, aromatic polymers, chlorinated plastics, polycarbonates, polyamides or a combination thereof.

12. The degradation process according to claim 1, wherein said process is carried out in a plant which comprises:
   a unit in which said plastic material is melted according to the working conditions of step a),
   a unit in which said molten material, coming from the previous unit, is dehalogenated, according to the working conditions of step b)
   a unit in which said dehalogenated, molten material from the previous unit is subjected to thermal degradation according to the operating procedures of step c).

13. The process according to claim 12 wherein the unit in which thermal degradation c) occurs is a tubular reactor equipped with several multipass tubes.

14. The process according to claim 12 comprising at least one separation unit in which the hydrogen and the non condensable C1-C2 fractions are separated from the remaining light and condensable C3-C7 fractions, from the intermediate and condensable C8-C16 fractions, from the high-boiling heavy fractions (C17-C20/C30) and residues containing any solid fractions >C30.

15. The process according to claim 14, wherein said at least one separation unit comprises a further unit or a section thereof in which the C3-C7 fractions are condensed.

16. The process according to claim 15, wherein said further separation unit or section thereof, in which the C3-C7 fractions are condensed, it is combined with at least one other unit in which the intermediate C8-C16 hydrocarbon streams are split from the high-boiling heavy C17-C20/C30 hydrocarbons and C30+ residues.

17. The process according to claim 14, wherein the residue containing any solids is mainly recycled, except for a drain to avoid accumulations, in a unit upstream of said plant, where it can be gasified/enhanced to energetically self-sustain the whole process.

18. The process according to claim 12, wherein the unit in which step b takes place, comprises a further unit or a section thereof for separating of halogenidric acid, from the dehalogenated polymer.

19. The process according to claim 12, wherein non-condensable C1-C2 fractions are destined to the production of hydrogen for the hydro-finishing of hydrocarbons and are sent to a conventional train normally used in a refinery for the generation of hydrogen comprising:

(i) a naphtha steam reformer in which syngas is produced;
(ii) the syngas coming from the previous step ii) is sent to a water-gas shift reactor; and
(iii) the hydrogen from the previous step (ii) is separated from the CO2 by amine washing or by pressure swing adsorption.

20. The degradation process according to claim 12, wherein the plant in which the process is conducted comprises:

a soaker downstream of the unit in which step c) takes place, in order to improve the degradation of the dehalogenated mixture coming from step (b) and treated in step c).

21. The degradation process according to claim 12, wherein the unit in which step a) takes place and/or the unit in which step b) takes place comprise at least one reactor for gas-phase non-isothermal reactions (100) comprising:

a tubular reactor (10) comprising at least one tube (11) through which the reaction fluids (A) pass and in which the mixture of hydrocarbons produced in step c) is defined, and in which tubular reactor a portion (30) is defined where at least one non-isothermal reaction take place, a shell (20) external to said tubular reactor (10) in which the polymeric mixture (B) passes wherein (i) the reaction fluids (A) enter at the head of said tubular reactor (10) and exit at the tail of said tubular reactor (10), and said portion (30) where at least one non-isothermal reaction takes place is filled with a specific catalyst for said reaction;
(ii) the cooling/heating polymeric mixture (B) flowing in the shell can be introduced into said reactor in solid phase, liquid phase and/or a combination of both and acts both as a cooling fluid and as a heater for the reaction fluids (A) at different portions of the same tubular reactor (10);
(iii) in said external shell (20) at least one liquid-gas separation zone (40) is defined, in which at least one liquid gas separation step of the polymeric mixture (B) takes place,
(iv) in which:
   when the reaction is exothermic, said reactor is used to preheat the reagent fluids (A) before said exothermic reaction takes place and the catalyst is located at the tail of the reactor.

22. The process according to claim 21, wherein said reactor (100) is inserted, in the unit in which the first thermal step a) takes place, the exothermic hydrocarbon hydro-finishing reaction is carried out in said reactor (100), the flow (A) contains as entering reactants hydrocarbons and hydrogen which are fed at a temperature of 200° C.-240° C. in a bath of molten plasmix at about 250° C.-270° C. to initially activate the catalyst, the exothermic reaction will then progressively raise the temperature of the catalytic bed, which will then be maintained at 300° C.-320° C.

23. The process according to claim 21, wherein said reactor (100) is inserted in the unit in which the dechlorination step b) takes place and in said reactor (100) the exothermic hydrocarbon hydro-finishing reaction is carried out, the flow (A) contains hydrocarbons and hydrogen as entering reactants which are fed at a temperature of 200° C.-240° C. in a molten plasmix bath at about 250° C.-270° C. to initially activate the catalyst, the exothermic reaction will then progressively raise the temperature of the catalytic bed, which will then be maintained at 350-370° C.

24. The process according to claim 15 wherein the condensed C3-C7 hydrocarbons are further treated in a separation process.

25. The process according to claim 16 wherein the intermediate hydrocarbons are further treated in a separation process to obtain gasolines and gas oils.

* * * * *